United States Patent [19]

Moore et al.

[11] Patent Number: 5,465,816
[45] Date of Patent: Nov. 14, 1995

[54] SLACK ADJUSTING BRAKE CYLINDER FOR A BRAKE UNIT ON A RAILWAY TRANSIT VEHICLE

[75] Inventors: Roland S. Moore, Taylors; Howard T. Tran, Greenville, both of S.C.

[73] Assignee: Westinghouse Air Brake Company, Wilmerding, Pa.

[21] Appl. No.: 277,837

[22] Filed: Jul. 20, 1994

[51] Int. Cl.[6] .................................................. F16D 65/38
[52] U.S. Cl. ............................. 188/196 P; 188/198
[58] Field of Search .................. 188/196 R, 196 D, 188/197, 196 F, 196 P, 198, 199, 71.8, 79.51

[56] References Cited

U.S. PATENT DOCUMENTS

| | | | |
|---|---|---|---|
| 3,338,353 | 8/1967 | Lucien | 188/196 P |
| 4,676,346 | 6/1987 | Barberis | 188/196 D X |
| 4,895,228 | 1/1990 | Washbourn et al. | 188/198 |
| 5,080,202 | 1/1992 | Tristano et al. | 188/196 P X |

FOREIGN PATENT DOCUMENTS 0861155  9/1981  U.S.S.R. .

Primary Examiner—Robert J. Oberleitner
Assistant Examiner—Peter M. Poon
Attorney, Agent, or Firm—James O. Ray, Jr.

[57] ABSTRACT

A slack adjusting brake cylinder for use in a fluid brake unit of a railway transit vehicle having a brake piston slidably mounted on a support rod within a brake cylinder receiving cavity of the brake unit. A plurality of friction/load rings are slidably mounted on the support rod, a first side of which serves as an abutment stop to limit the extent of return of the brake piston along the support rod. The friction/load rings are tightly engaged on the support rod so that they are slidable only in response to fluid brake pressure forces. A spring loaded compression member is engaged with a second side of the friction/load rings, and is partially compressed between the brake piston and the friction/load rings when the brake piston is advanced outwardly on the support rod in response to activation of the brake unit, and functions to return the brake piston into engagement with the friction/load rings when the brake unit is deactivated. The degree of compression of the spring loaded compression member is limited so that when the compression has reached the limit, the spring loaded compression member will push the friction/load rings to a new position on the support rod.

15 Claims, 5 Drawing Sheets

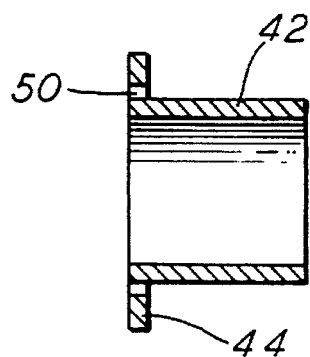
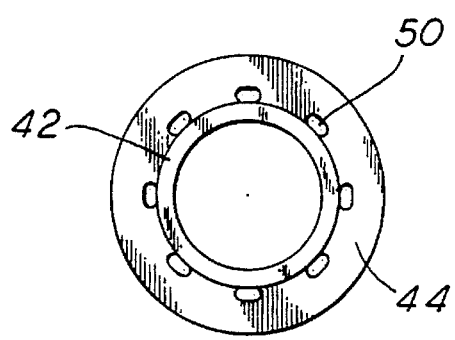
FIG. 5   FIG. 6
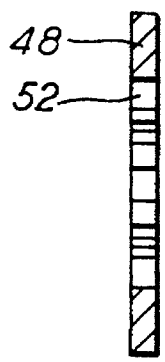
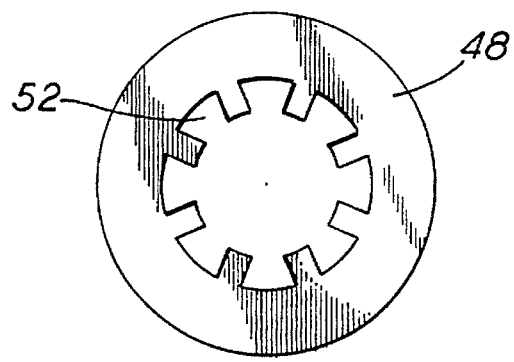
FIG. 7   FIG. 8
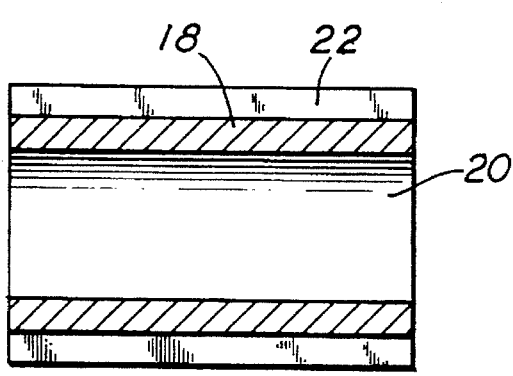
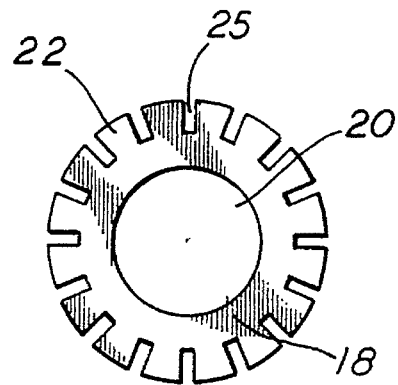
FIG. 9   FIG. 10

SLACK ADJUSTING BRAKE CYLINDER FOR A BRAKE UNIT ON A RAILWAY TRANSIT VEHICLE

FIELD OF THE INVENTION

The present invention relates generally to slack adjusters for brake units on passenger type railway vehicles and, more particularly, to a simple, improved and more reliable slack adjusting apparatus for a hydraulic, pneumatic or combination hydraulic-pneumatic brake cylinder on a passenger railway vehicle which will more reliably maintain the required brake shoe to wheel clearance. In addition, the subject slack adjusting apparatus is easier and less costly to manufacture as compared to prior art type slack adjusting apparatus.

BACKGROUND OF THE INVENTION

It is generally well known in the art that passenger transit railway vehicles, such as subway cars and the like, are provided with individual brake cylinder units that apply a braking force onto the individual transit vehicle wheels. Such braking force may be applied either against the rolling face surface or edge surface of the wheel, or against one or both sides of a metallic brake disk in rolling motion with the wheel. Most such brake cylinder units comprise a rather heavy body structure rigidly secured to the vehicle understructure adjacent to a wheel, which houses a brake piston reciprocally mounted within a receiving cavity. The unit is activated pneumatically, hydraulically, or through a combination hydraulic-pneumatic system, to drive a portion of the brake piston from the cavity, and thereby drive one or more brake shoes against the associated wheel. Depending on the brake design, the advancing outer end of the brake piston will directly or indirectly drive one or more brake shoes against a rolling wheel surface, or else activate linkage to cause one or more disk brake shoes to press on one or both sides of a rotating brake disk.

Such brake cylinders units are normally provided with some sort of slack adjusting means to maintain a predetermined clearance between the brake shoe or shoes and the wheel or disk, so that the brake piston is adjusted each time the vehicle brakes are applied. Indeed, many such slack adjusters have been disclosed in the prior art. Such prior art slack adjusters, however, are normally rather complicated, expensive to produce, and are of rather limited reliability.

In one such prior art slack adjuster, the brake piston is mounted for reciprocal motion on a support rod, with the slack adjuster also slidably attached to the support rod, such as to define an adjustable starting point, and return point for the reciprocal motion of the brake piston. Such a slack adjuster comprises a rod gripping means designed to tightly engage the support rod so that it is not readily slidable on the support rod, but is slidable with the application of fluid pressure forces applied by such brake cylinder.

A spring loaded compression member is also provided which is positioned to engage a second side of the rod gripping means, and is designed to be compressed between a flange on the brake piston and the rod gripping means when the brake piston is advanced in response to application of the brakes. As a result of such spring loaded compression, the compression member will return the brake piston into engagement with the rod gripping means when the brake cylinder is deactivated; i.e., when the brake fluid pressure is released. Each time the brakes are applied, the increase in fluid pressure will cause the brake piston to be partially advanced from the piston receiving cavity, whereby the spring loaded compression member is compressed, so that it will function to return the brake piston to a position against the rod gripping means when the brakes are released. The spring loaded compression member must have a limited degree of compressibility, however, so that the extent of its compressibility is fully utilized with each application of the brake forces. Then, as the brake shoe or shoes wear away, and the brake piston is forced to be moved further out with respect to the support rod, the full extent of compressibility of the spring loaded compression member is utilized before the brake piston reaches its maximum extended position, so that the fully compressed spring loaded compression member cannot be further compressed, and as a result the rod gripping means is incrementally pushed outward along the support rod with each application of the brake, to thereby maintain a constant slack in the system, and accordingly a substantially constant clearance between the brake shoe or shoes and wheel or disk.

While a number of different concepts have been utilized to fashion a suitable rod gripping means, none have been particularly ideal, as all have been prone to relatively short life, in quickly failing to maintain the desired clearance between brake shoe or shoes and wheel or brake disk, and in being rather costly to fabricate. Specifically, as a result of wear on the various components and cylinder walls, such components may fail to grip as intended, thereby failing to provide the required shoe to wheel clearance as intended. In the manufacture of these slack adjusting components, some tolerances are so critical, that component parts must be sorted and matched in order to function properly and meet code tests.

SUMMARY OF THE INVENTION

The present invention is predicated upon a new and unique slack adjusting piston for fluid brake units on railway transit vehicles (i.e., hydraulic, pneumatic or a combination of both), which utilizes a novel and improved rod gripping means of relatively simple design, and is more reliable than those of the prior art. The slack adjusting cylinder of this invention will more reliably maintain the required clearance between the brake shoe or shoes and wheel or disk, even after considerable wear of the cylinder wall and other components, and is less likely to fail in service. In addition, the subject slack adjusting cylinder is easier and less costly to manufacture as compared to the prior art slack adjusting cylinders and does not require sorting and matching of component parts.

In essence, the slack adjusting brake cylinder of this invention is of the type having a reciprocating piston mounted on a support rod, whereby an end of the support rod is secured to a base portion of a receiving cavity within the brake unit. The support rod is positioned to extend from the base portion along an axial center of the receiving cavity. Accordingly, the brake piston, slidably mounted on such support rod, is also adapted for reciprocal motion within the receiving cavity, such that when the vehicle brakes are applied, an end of the brake cylinder will be advanced from the brake cylinder receiving cavity to apply the necessary braking action. As is known, one or more inlet ports are provided at the base of the receiving cavity through which the hydraulic or pneumatic fluid is admitted, in response to the vehicle operator's application of the brakes, which cause the brake fluid to drive the brake piston outwardly.

At least one friction/load ring is slidably mounted on the support rod to function as the rod gripping means. A first side of such friction/load ring serves as an abutment stop to limit the extent of return of the brake piston along the support rod when the brake unit is deactivated from applying the brakes to such vehicle. The friction/load ring is designed to tightly engage the support rod so that it is slidable on the support rod only with the application of fluid pressure forces applied by the brake unit.

As in prior art designs, a spring loaded compression member is also provided which is positioned to engage a second side of the friction/load ring, and is designed to be compressed between a flange on the brake cylinder and the friction/load ring when the brake piston is advanced in response to application of the brakes. As a result of such spring loaded compression, the compression member will return the brake piston into engagement with the friction/load ring when the brake unit is deactivated. Each time the brakes are applied, the increase in fluid pressure will cause the brake piston to be partially advanced from its cavity, whereby the spring loaded compression member is compressed, so that it will function to return the brake piston to a position against the friction/load ring when the brakes are released. The spring loaded compression member must have a limited degree of compressibility, however, so that the extent of its compressibility is fully utilized with each application of the brake forces. Then, as the brake shoe surfaces wear away, and the brake piston is forced to be moved further out with respect to the support rod, the full extent of compressibility of the spring loaded compression member is utilized before the brake piston reaches its maximum extended position, so that the fully compressed spring loaded compression member cannot be further compressed, and as a result the friction/load ring is incrementally pushed outward along the support rod with each application of the brake, to thereby maintain a constant slack in the system, and accordingly a substantially constant clearance between the brake shoe or shoes and wheel or disk.

OBJECTS OF THE INVENTION

It is, therefore, one of the primary objects of the present invention to provide a new and improved slack adjuster for a brake cylinder on railway transit vehicles which is more reliable than prior art slack adjusting cylinders.

It is another primary object of the present invention to provide a new and improved slack adjusting brake cylinder for a railway transit vehicles which is of simpler design, and therefore, more reliable than prior art slack adjusting cylinders.

Still another primary object of this invention is to provide a new and improved slack adjusting brake cylinder on railway transit vehicles which will more reliably maintain the required slack within the system, even after considerable wear of the cylinder wall and other components, as compared to the prior art slack adjusting cylinders.

A further object of this invention is to provide a new and improved slack adjusting brake cylinder on railway transit vehicles which is less likely to fail in service as compared to the prior art slack adjusting cylinders.

A still further object of this invention is to provide a new and improved slack adjusting brake cylinder on railway transit vehicles which is easier and less costly to manufacture as compared to the prior art slack adjusting cylinders.

In addition to the above-described objects and advantages of the slack adjusting brake cylinder for railway transit vehicles of this invention, various other objects and advantages of the present invention will become more readily apparent to those persons who are skilled in the same and related arts from the following more detailed description of the invention, particularly, when such description is taken in conjunction with the attached drawing figures and with the appended claims.

BRIEF DESCRIPTION OF THE DRAWINGS

FIG. 5 is a cross-sectional side view of the slack adjusting sleeve shown in FIG. 1.

FIG. 6 is an end view of the slack adjusting sleeve shown in FIG. 5.

FIG. 7 is a cross-sectional view of the retaining washer shown in FIG. 1.

FIG. 8 is a plan view of the retaining washer shown in FIG. 7.

FIG. 9 is a cross-sectional view of the guide sleeve shown in FIG. 1.

FIG. 10 is an end view of the guide sleeve shown in FIG. 9.

DESCRIPTION OF A PREFERRED EMBODIMENT OF THE INVENTION

Figure 1:
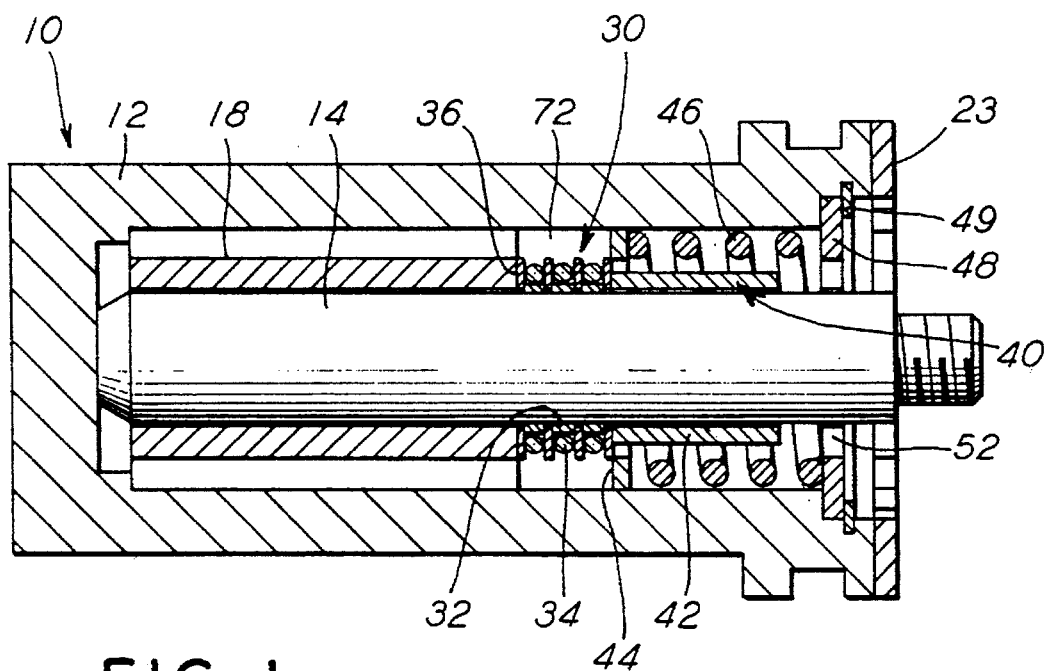
FIG. 1 is a cross-sectional plan view of a slack adjusting cylinder in accordance with a presently preferred embodiment of this invention.
Figure 2:
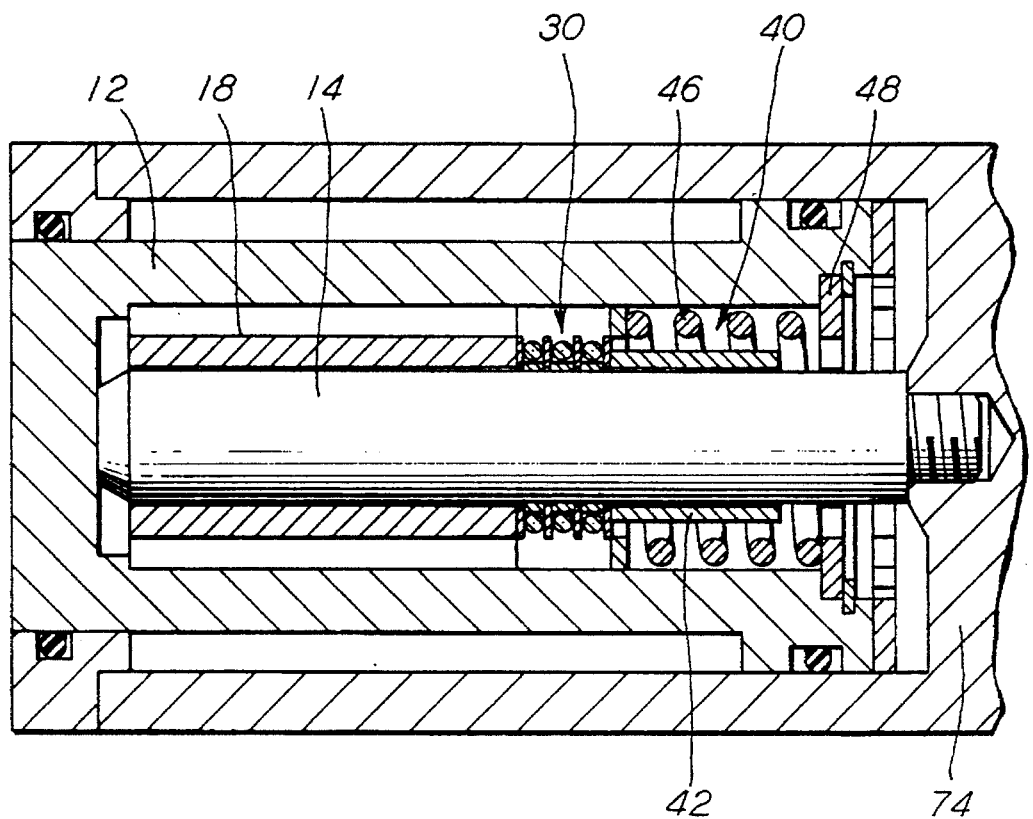
FIG. 2 is a partial, cross-sectional view of a fluid brake unit having a slack adjusting cylinder as shown in FIG. 1 within the brake cylinder receiving cavity.

Prior to proceeding with a more detailed description of the slack adjusting brake cylinder of this invention, it should be noted that throughout the several views illustrated in the attached drawings, identical components which have associated therewith identical functions have been identified with identical reference numerals for the sake of clarity.

Referring now to the several drawings, illustrated therein is a slack adjusting brake cylinder for a fluid brake unit on a passenger railway vehicle, generally designated 10, and comprises a reciprocating brake piston 12 mounted on a support rod 14. An end of the support rod 14 is secured or securable to a base portion 74 of a receiving cavity 72 within the brake unit 10, with the support rod 14 extending from the base portion 74 along an axial center of the receiving cavity 72. Accordingly, the brake piston 12, slidably mounted on said support rod 14, is also adapted for reciprocal motion within the brake cylinder receiving cavity 72, such that when the vehicle brakes are applied, an end of the brake piston 12 will be partially advanced from the receiving cavity 72 to apply the necessary braking action. As is known, one or more inlet ports (not shown) are provided at the base portion 74 through which the hydraulic or pneumatic fluid is admitted, in response to the vehicle operator's application of the brakes, which cause the brake fluid to drive the brake piston 12.

Figure 3:
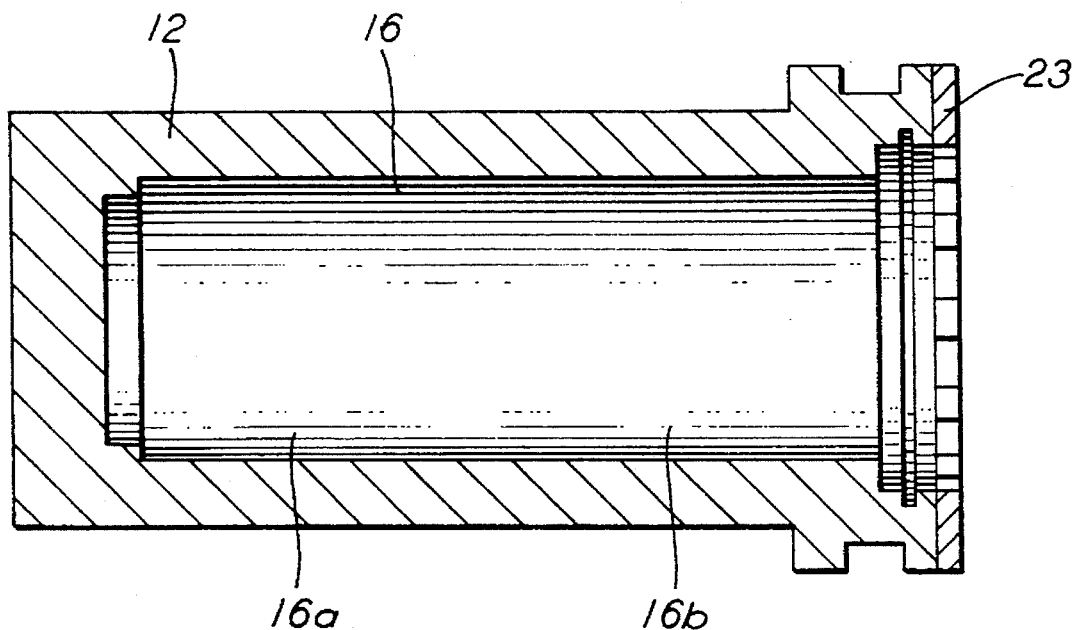
FIG. 3 is a cross-sectional plan view of the brake piston portion of the slack adjusting cylinder shown in FIG. 1.
Figure 4:
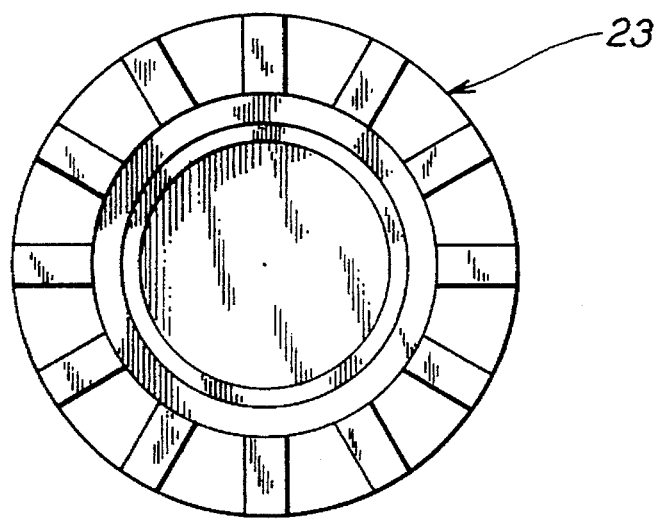
FIG. 4 is an end view of the brake piston shown in FIG. 3.

As shown in more detail, brake piston 12 is provided with a cylindrical cavity 16, as best depicted in FIG. 3, having a base portion 16a and a skirt portion 16b, with a guide sleeve 18 tightly secured within the base portion 16a of cavity 16. Guide sleeve 18 is provided with fins 22 and a cylindrical aperture 20 at its axis which is sized to slidably fit onto support rod 14. Accordingly, with guide sleeve 18 rigidly secured in the base portion 16a of cavity 16, brake piston 12, and guide sleeve 18, will be adapted to jointly reciprocate on support rod 14 as a single unit. A base disk 25, having a plurality of fluid channels 22 in the face thereof, is attached to the base of brake piston 12 for the purpose of more evenly distributing the pressurized fluid across the base of brake piston 12 when the brakes are activated.

A plurality of friction/load rings 30, are tightly fitted onto support rod 14 immediately below guide sleeve 18, which serve as an abutment stop against guide sleeve 18, to limit the extent of return of the brake piston 12, along the support rod 14, when the brake unit is deactivated from applying the brakes to the vehicle. While the form and structure of the friction/load rings 30 is not particularly critical, it is essential that they be designed to tightly engage the support rod 14, so that they are not easily slidable thereon, but rather, can nevertheless, be moved with respect to the support rod 14, in response to the force of the fluid pressure being applied by the brake unit. As shown in the drawings, the friction/load rings 30, as utilized in the embodiment depicted, each comprise a friction ring, or a first "C" ring 32, fabricated of rectangular spring steel sized to be tightly clipped onto support rod 14, and also a load ring, or second "C" ring 34, fabricated of spring steel wire, clipped over "C" rings 32, with each pair of "C" rings 32 and 34 separated by washers 36. When manufactured, the two "C" rings 32 and 34 should be made somewhat undersized so that when clipped onto support rod 16, they will be attached thereto with a rather limited degree of slidability, as noted. This combination of "C" rings can be easily fabricated to provide any degree of tight gripping action desired. While three such friction/load rings 30 are shown, any number, including one such friction/load ring, can be utilized if adequate to provide the necessary gripping action to prevent them, or it, from being moved with respect to the support rod 14, except by the fluid pressure force of the brake unit.

A spring loaded compression member, generally designated 40, must also be provided which not only serves to return the brake piston 12 into engagement with friction/load rings 30, when the brake unit is deactivated, but further serves to readjust the position of the friction/load rings 30 on support rod 14, as necessary to continually adjust the slack in the system and substantially maintain the desired brake shoe clearance. As shown, the spring loaded compression member 40, comprises a sleeve 42, having a flange 44 thereon, slidably positioned on support rod 14 with the outer surface of flange 44 in contact with the friction/load rings 30; and a compression spring 46 in contact with the inner surface of flange 44. A retaining washer 48 is positioned at the opening to cavity 16 in the base of brake piston 12, and there held in place by clip ring 49, such that compression spring 46 is firmly positioned between retaining washer 48 and flange 44. Holes 50 are provided through flange 44 and slots 52 through retaining washer 48 for purposes of permitting unrestricted flow of the brake fluid throughout the system. The length of slack adjusting sleeve 42 is critical to the extent that the space "A" (FIGS. 11 and 13) between the end of slack adjusting sleeve 42 and the near surface of retaining washer 48 will be the slack adjusting distance to be maintained by the slack adjusting cylinder 10 of this invention, as will be described below.

Figure 11:
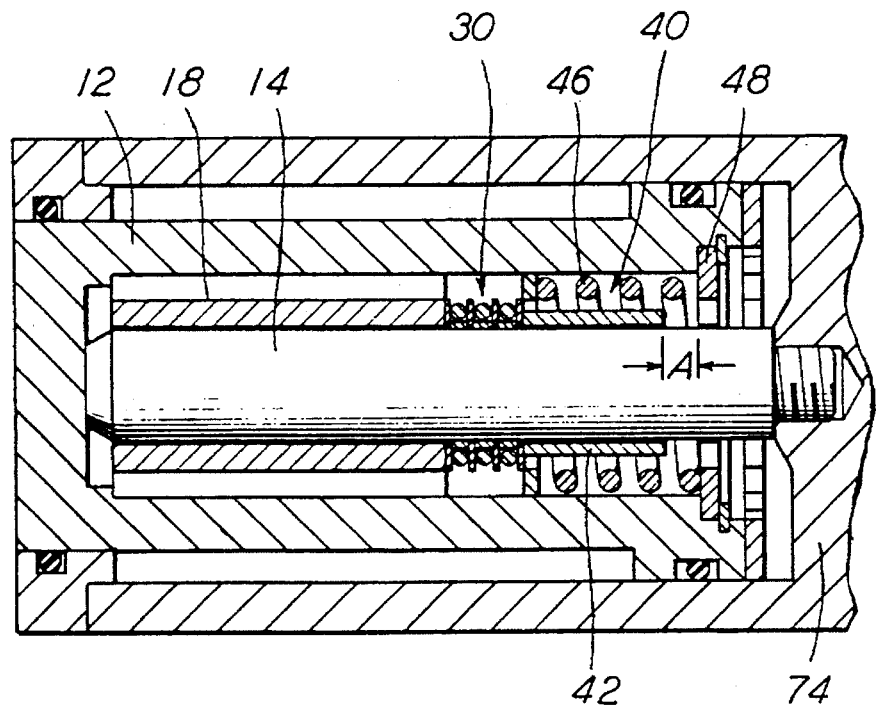
FIG. 11 is a cross-sectional view of the slack adjusting cylinder shown in FIG. 1 in its lowermost position within a brake cylinder receiving cavity.
Figure 12:
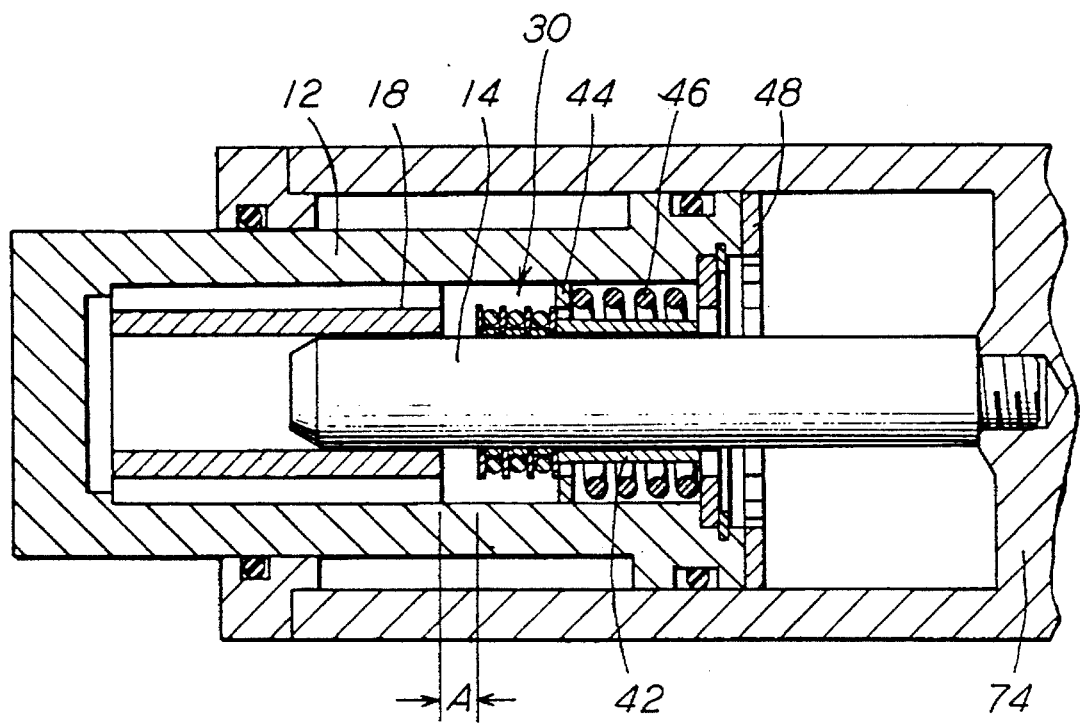
FIG. 12 is substantially like FIG. 11 except that is shows the position of the brake cylinder fully extended within the brake cylinder receiving cavity depicting the position of the components when the vehicle brakes are applied.
Figure 13:
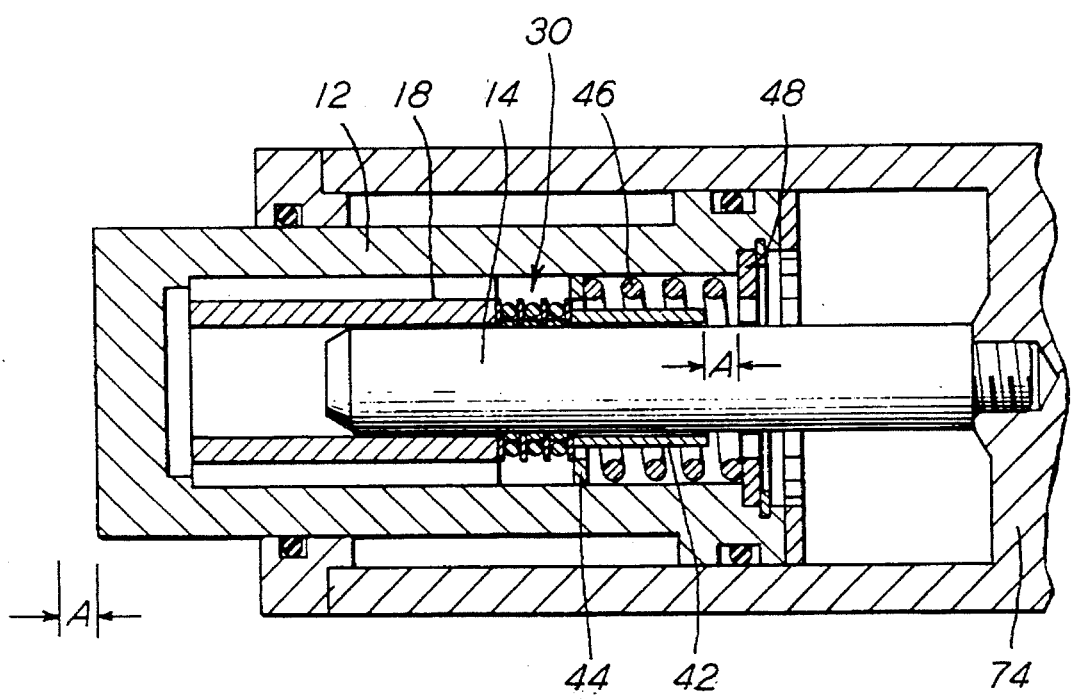
FIG. 13 is substantially like FIGS. 11 and 12 except that it shows the position of the brake cylinder and components after release of the brake, and the brake piston has been reset to adjust the slack.

Reference to FIGS. 11, 12 and 13 will illustrate the operation of the slack adjusting cylinder of this invention, whereby FIG. 11 shows the brake piston 12 in it lowermost position within receiving cavity 72. The relative positions of the various components as shown, would be typical of a newly installed brake cylinder 10. As shown, the brake piston 12 is positioned on support rod 14 as far downwardly as it will go, with the end of support rod 14 abutting against the base of cavity 16. As can be seen, compression spring 46 is fully extended so that the end of slack adjusting sleeve 42 is spaced from retaining washer 48 by the distance "A". In this position, friction/load rings 30 are sandwiched between the lower edge of guide sleeve 18 and flange 44 on slack adjusting sleeve 42. As noted, this would be a typical starting position for newly installed equipment.

Reference to FIG. 12 will illustrate the movement of the components when the brake unit is activated to apply the brakes to the vehicle, showing that the brake piston 12 has been fully extended on support rod 14 as necessary to apply the necessary braking action. As will be apparent from comparing FIGS. 11 and 12, the fluid pressure will not only cause brake piston 12 to be advance partially out of receiving cavity 72, but in undergoing such motion, retaining washer 48 will firstly cause compression spring 46 to be compressed. This is because friction/load rings 30 are so tightly maintained in position on support rod 14 that the compression force of compression spring 46 should not be sufficient move friction/load rings 30. Eventually, however, retaining washer 48 will become engaged with the outer end of slack adjusting sleeve 42, so that compression spring 46 cannot be further compressed. At this point, therefore, retaining washer 48 will start to push on slack adjusting sleeve 42, which will in turn cause friction/load rings 30 to be pushed outwardly along support rod 14 to whatever extent brake piston 12 is further advanced on support rod 14. As can be seen, the slack distance "A" is transferred to a location between friction/load rings 30 and guide sleeve 18. The positions depicted represent those achieved when the vehicle brakes are fully applied.

Reference to FIG. 13 will illustrate the movement of the components when the brake force pressure is released. As can be seen, without the brake force pressure to maintain compression spring 46 in a compressed condition, compression spring 46 will expand to its normal expanded state. Since friction/load rings 30 are not slidable on support rod 14 by virtue of the spring force, slack adjusting sleeve 42 will remain in place against the friction/load rings 30, so that compression spring 46 will push against retaining washer 48, and thereby cause brake piston 12 to be returned within receiving cavity 72 until guide sleeve 18 contacts friction/load rings 30. As can be seen, the re-expansion of compression spring 46 will cause the distance "A" to be transferred back to a location between the end of sleeve 42 and retaining washer 48. Accordingly, each time the vehicle brakes are applied, the spring loaded compression member 40 will be compressed against the friction/load rings 30 as the brake piston 12 is advanced outwardly on support rod 14, and when the brakes are released, the stored compression force will cause the brake piston 12 to be returned. To the extent any brake shoe surfaces wear away, brake piston 12 will be driven further out along support rod 14, so that spring loaded compression member 40 will be fully compressed before brake piston 12 reaches its most outward position, and therefore, the spring loaded compression member 40 will, in such fully compressed state, push friction/load rings 30 further out on support rod 14 to the extent brake piston 12 is pushed further than the time before.

While a preferred embodiment of the slack adjusting brake cylinder of the present invention has been described in detail above, it should be apparent to those persons skilled in the art that various other embodiments, adaptations and modifications of the invention could be made without departing from the spirit and scope of the invention.

For example, as noted in the specification, the friction/load rings 30 could take any forms as long as they remain tightly gripped on support rod 14 and cannot be moved by the compressive spring forces of the spring loaded compression member 40, but can be moved by the hydraulic or pneumatic forces of the brake cylinder when the spring loaded compression member 40 is fully compressed. Obviously, the spring loaded compression member 40 could itself be produced in differing forms, as long as it has a fixed degree of compressibility to maintain the desired clearance "A" to suitably self adjust the desired slack in the brake system. Obviously, too, is the fact that the brake piston 12 could take different forms as may be essential to suitably fit within a brake cylinder cavity, and as may be desired for ease of fabrication. Clearly, other modifications and embodiments could be developed without departing from the spirit of the invention.

I claim:

1. A slack adjusting brake cylinder for use in a fluid brake unit of a railway transit vehicle comprising:

(a) a support rod, a first end of which is securable to a base portion of a brake piston receiving cavity of such brake unit, such that said support rod extends from such base portion along an axial center of such brake piston receiving cavity;

(b) a brake piston slidably mounted on said support rod and adapted for reciprocal motion along said support rod and within such brake piston receiving cavity;

(c) at least one friction/load ring slidably mounted on said support rod, a first side of which is adapted to be an abutment stop to limit the extent of return of said brake piston along said support rod, said friction/load ring adapted to tightly engage said support rod so as to be slidable on said support rod only in response to fluid brake pressure forces;

(d) a spring loaded compression member engaged with a second side of said at least one friction/load ring, adapted for limited compression between said brake piston and said at least one friction/load ring when applied brake forces move said brake piston outwardly along said support rod and return said brake piston into engagement with said at least one friction/load ring when such applied brake forces are released, and further adapted to move said at least one friction/load ring outwardly on said support rod after such limited compression has been attained; wherein said spring loaded compression member comprises a sleeve having a flange thereon and a compression spring, said sleeve being slidably positioned on said support rod, the outer surface of said flange being engaged with said second side of said at least one friction/load ring, and the inner surface of said flange being engaged with said compression spring.

2. A slack adjusting brake cylinder according to claim 1 in which said at least one friction/load ring is a plurality of friction/load rings.

3. A slack adjusting brake cylinder according to claim 1 in which said friction/load ring comprises a first "C" ring formed of rectangular spring steel tightly clipped onto said support rod, and a second "C" ring formed of cylindrical spring steel, tightly clipped over said first "C" ring.

4. A slack adjusting brake cylinder according to claim 1 in which said brake piston is provided with a cavity extending axially from an inside end having a base portion and a skirt portion, and further includes a guide sleeve secured within said base portion of said cavity, said guide sleeve having an aperture therethrough adapted to be fitted onto said support rod such that said reciprocal motion of said brake piston is achieved in unison by said brake piston and said guide sleeve, and such that said at least one friction/load ring and said spring loaded compression member on said support rod are disposed under said skirt portion.

5. A slack adjusting brake cylinder for use in a fluid brake unit of a railway transit vehicle comprising:

(a) a support rod, a first end of which is securable to a base portion of a brake piston receiving cavity of such brake unit, such that said support rod extends from such base portion along an axial center of such brake cylinder receiving cavity;

(b) a brake piston having a cavity therein, said cavity having an inner portion and an outer skirt portion, said inner portion of said cavity being slidably mounted on said support rod and adapted for reciprocal motion along said support rod and within such brake piston receiving cavity;

(c) at least one friction/load ring slidably mounted on said support rod under said skirt portion of said cavity, a first side of which is adapted to be an abutment stop to limit the extent of return of said brake piston along said support rod, said friction/load ring adapted to tightly engage said support rod so as to be slidable on said support rod only in response to fluid brake pressure forces;

(d) a spring loaded compression member associated with said brake piston, and engaged with a second side of said at least one friction/load ring, adapted to be compressed between said brake piston and said at least one friction/load ring when said brake piston is advanced outwardly on said support rod in response to activation of brake forces, and further adapted to return said brake piston into engagement with said at least one friction/load ring when such brake forces are deactivated, and such that the degree of compression of said spring loaded compression member is limited so that when said compression has reached such limit, said spring loaded compression member will push said at least one friction/load ring to a new position on said support rod; wherein said spring loaded compression member comprises a sleeve having a flange thereon and a compression spring, said sleeve being slidably positioned on said support rod, the outer surface of said flange being engaged with said second side of said at least one friction/load ring, and the inner surface of said flange being engaged with said compression spring.

6. A slack adjusting brake cylinder according to claim 5 in which said at least one friction/load ring is a plurality of friction/load rings.

7. A slack adjusting brake cylinder according to claim 5 in which said friction/load ring comprises a first "C" ring formed of rectangular spring steel tightly clipped onto said support rod, and a second "C" ring formed of cylindrical spring steel, tightly clipped over said first "C" ring.

8. A slack adjusting brake cylinder according to claim 5 in which said sleeve comprises a sleeve portion of predetermined length, such that said compression spring extends along said predetermined length of said sleeve portion.

9. A slack adjusting brake cylinder according to claim 8 in which said compression spring is longer than said predetermined length such that said compression spring is adapted to be compressed between said flange on said sleeve and a retaining washer when said brake piston is advanced along said support rod, until said retaining washer contacts said sleeve portion of said sleeve, and further movement of said brake piston along said support rod will cause said sleeve to push said friction/load ring to a new position on said support rod.

10. A slack adjusting brake cylinder according to claim 5 which further includes a guide sleeve secured within said base portion of said cavity, said guide sleeve having an aperture therethrough adapted to be fitted onto said support rod such that said reciprocal motion of said brake piston is achieved in unison by said brake piston and said guide sleeve, and such that said at least one friction/load ring and said spring loaded compression member on said support rod are disposed under said skirt portion.

11. A slack adjusting brake cylinder for use in a fluid brake unit of a railway transit vehicle comprising:

(a) a support rod, a first end of which is securable to a base portion of a brake cylinder receiving cavity of such brake unit, such that said support rod extends from such base portion along an axial center of such brake cylinder receiving cavity;

(b) a brake piston having a cavity therein, said cavity having a base portion and a skirt portion, and a guide sleeve positioned at said base portion of said cavity, said guide sleeve slidably mounted on said support rod and adapted for reciprocal motion along said support rod and such that said brake piston and said guide sleeve are slidable within such brake cylinder receiving cavity, and such that an end of said brake piston will be advanced from such brake cylinder receiving cavity to apply the necessary braking action in response to an increase in fluid pressure when such brake unit is activated to apply the brakes to such vehicle;

(c) at least one friction/load ring slidably mounted on said support rod, a first side of which is adapted to be an abutment stop to limit the extent of return of said brake piston along said support rod when such brake unit is deactivated from applying the brakes to such vehicle, said friction/load ring adapted to tightly engage said support rod so that it is slidable on said support rod only in response to fluid brake pressure forces;

(d) a spring loaded compression member associated with said brake piston, and engaged with a second side of said at least one friction/load ring, adapted to be compressed between said brake piston and said at least one friction/load ring when said brake piston is advanced from such brake cylinder receiving cavity upon activation of such brake unit, and further adapted to return said brake piston into engagement with said at least one friction/load ring when such brake unit is deactivated, and such that the degree of compression of said spring loaded compression member is limited so that when said compression has reached such limit, said spring loaded compression member will push said at least one friction/load ring to a new position on said support rod; wherein said spring loaded compression member comprises a sleeve having a flange thereon and a compression spring, said sleeve being slidably positioned on said support rod, the outer surface of said flange being engaged with said second side of said at least one friction/load ring, and the inner surface of said flange being engaged with said compression spring.

12. A slack adjusting brake cylinder according to claim 11 in which a plurality of said at least one friction/load ring is provided.

13. A slack adjusting brake cylinder according to claim 11 in which said friction/load ring comprises a first "C" ring formed of rectangular spring steel tightly clipped onto said support rod, and a second "C" ring formed of cylindrical spring steel, tightly clipped over said first "C" ring.

14. A slack adjusting brake cylinder according to claim 11 in which said sleeve comprises a sleeve portion of predetermined length, such that said compression spring extends along said predetermined length of said sleeve portion.

15. A slack adjusting brake cylinder according to claim 14 in which said compression spring is longer than said predetermined length such that said compression spring is adapted to be compressed between said flange on said sleeve and a retaining washer when said brake piston is advanced along said support rod, until said retaining washer contacts said sleeve portion of said sleeve, and further movement of said brake piston along said support rod will cause said sleeve to push said friction/load ring to a new position on said support rod.

* * * * *